(12) United States Patent
Kim et al.

(10) Patent No.: US 9,914,289 B2
(45) Date of Patent: Mar. 13, 2018

(54) SYSTEM FOR LAMINATING OPTICAL FILM AND METHOD FOR MANUFACTURING DISPLAY UNIT USING THE SAME

(71) Applicant: LG CHEM LTD., Seoul (KR)

(72) Inventors: Kyoung-Sik Kim, Daejeon (KR);
Eung-Jin Jang, Daejeon (KR);
Suk-Jae Lee, Daejeon (KR);
Kyoung-Ho Cho, Daejeon (KR);
Cheon-Ho Park, Daejeon (KR);
Won-Cheul Ju, Daejeon (KR);
Beom-Seok Lee, Daejeon (KR);
Jea-Han Ryoo, Daejeon (KR)

(73) Assignee: LG CHEM, LTD., Seoul (KR)

( * ) Notice: Subject to any disclaimer, the term of this patent is extended or adjusted under 35 U.S.C. 154(b) by 163 days.

(21) Appl. No.: 14/537,402

(22) Filed: Nov. 10, 2014

(65) Prior Publication Data

US 2015/0190995 A1     Jul. 9, 2015

Related U.S. Application Data

(63) Continuation of application No. PCT/KR2014/003608, filed on Apr. 24, 2014.

(30) Foreign Application Priority Data

Jan. 8, 2014   (KR) .................. 10-2014-0002582
Mar. 25, 2014  (KR) .................. 10-2014-0034705

(51) Int. Cl.
*B32B 37/18*     (2006.01)
*B32B 38/00*     (2006.01)
(Continued)

(52) U.S. Cl.
CPC ............ *B32B 38/18* (2013.01); *B32B 37/185* (2013.01); *B32B 37/0046* (2013.01); *B32B 37/02* (2013.01);
(Continued)

(58) Field of Classification Search
CPC ........... Y10T 156/1062; Y10T 156/125; Y10T 156/1322; Y10T 156/1751; B32B 37/185; B32B 38/18
See application file for complete search history.

(56) References Cited

U.S. PATENT DOCUMENTS 7,022,204 B2    4/2006   Kanbara et al.
8,040,469 B2   10/2011   Nakamura et al.
(Continued)

FOREIGN PATENT DOCUMENTS

CN    1470890 A    1/2004
CN    1737649 A    2/2006
(Continued)

OTHER PUBLICATIONS

Taiwanese Office Action dated Nov. 10, 2015 in Taiwanese Patent Application No. 103137546 (12 pages).

*Primary Examiner* — Mark A Osele
*Assistant Examiner* — Christopher C Caillouet
(74) *Attorney, Agent, or Firm* — Dentons US LLP

(57) ABSTRACT

A system for laminating an optical film according to an exemplary embodiment of the present disclosure includes a panel transfer unit to transfer a panel, a first laminating unit to laminate an optical film full-cut into a predetermined length on a first surface of the panel along a first direction parallel to a transfer direction of the panel, and a second laminating unit to laminate an optical film full-cut into a predetermined length on a second surface of the panel along a second direction equal or opposite to the first direction, the second laminating unit rotating the optical film supplied in a full-cut state along the second direction in a horizontal direction and laminating the optical film.

17 Claims, 12 Drawing Sheets

(51) Int. Cl.
  *B32B 3/18* (2006.01)
  *B32B 38/18* (2006.01)
  *B32B 37/00* (2006.01)
  *B32B 37/02* (2006.01)

(52) U.S. Cl.
  CPC ....... *B32B 38/0004* (2013.01); *B32B 2307/40* (2013.01); *B32B 2457/20* (2013.01); *Y10T 156/1062* (2015.01); *Y10T 156/125* (2015.01); *Y10T 156/1322* (2015.01); *Y10T 156/1751* (2015.01)

(56) References Cited

U.S. PATENT DOCUMENTS

| | | | |
|---|---|---|---|
| 8,172,631 | B2 | 5/2012 | Hirata et al. |
| 9,498,942 | B2 | 11/2016 | Kim et al. |
| 2005/0016670 | A1 | 1/2005 | Kanbara et al. |
| 2009/0218049 | A1 | 9/2009 | Kanbara et al. |
| 2010/0206485 | A1 | 8/2010 | Kodera |
| 2010/0283943 | A1* | 11/2010 | Kimura ............... B32B 38/1841 349/96 |
| 2011/0047775 | A1 | 3/2011 | Koshio et al. |
| 2011/0126988 | A1 | 6/2011 | Kitada et al. |
| 2012/0048460 | A1 | 3/2012 | Kitada et al. |

FOREIGN PATENT DOCUMENTS

| | | |
|---|---|---|
| CN | 100365450 C | 1/2008 |
| CN | 100517003 | 7/2009 |
| CN | 201317149 | 9/2009 |
| CN | 101823645 | 9/2010 |
| CN | 202911264 | 5/2013 |
| CN | 103158327 | 6/2013 |
| CN | 103329033 | 9/2013 |
| JP | 2009109979 | 5/2009 |
| JP | 10-2013-083784 A | 5/2013 |
| KR | 10-2004-0002796 A | 1/2004 |
| KR | 10-2009-0110249 A | 10/2009 |
| KR | 20100088036 A | 8/2010 |
| TW | M356132 U | 5/2009 |
| TW | 201213881 | 4/2012 |
| TW | I373445 B | 10/2012 |
| TW | 201347954 | 12/2013 |

\* cited by examiner

<UPPER SURFACE>

SYSTEM FOR LAMINATING OPTICAL FILM AND METHOD FOR MANUFACTURING DISPLAY UNIT USING THE SAME

CROSS-REFERENCE TO RELATED APPLICATION

The present application is a Continuation Bypass of International Application No. PCT/KR2014/003608 filed on Apr. 24, 2014, which claims priority to Korean Patent Application No. 10-2014-0002582 filed in the Republic of Korea on Jan. 8, 2014 and Korean Patent Application No. 10-2014-0034705 filed in the Republic of Korea on Mar. 25, 2014, the disclosures of which are incorporated herein by reference.

TECHNICAL FIELD

The present disclosure relates to a system for laminating an optical film and a method for manufacturing a display unit using the same, and more particularly, to a system for attaching an optical film that may increase procedural efficiency and efficiency in aspect of spatial utilization in a process of attaching an optical film onto both surfaces of a panel constituting a display device, and a method for manufacturing a display unit using the same.

BACKGROUND ART

For use in a display device, a display unit implemented by attaching an optical film such as a polarizing film onto both surfaces of a panel is manufactured by a manufacturing system, and FIG. 1 illustrates conceptually a part of a system for manufacturing a display unit according to a related art, and FIG. 2 illustrates a process of manufacturing a display unit using a manufacturing system.

Referring to FIGS. 1 and 2, a display unit is obtained by providing, to a panel 3, an optical film 2 with a release sheet 1 attached on one surface using a roll, cutting the optical film 2 into a size corresponding to the panel 3, and laminating the optical film 2 on one surface of the panel while removing the release sheet 1 attached to the optical film 2, and subsequently, laminating the optical film 2 on the other surface of the panel 3 through the same process.

However, in the case of the process of manufacturing a display unit according to the related art, a process of reversing the panel 3 is needed, hence efficiency of the process may reduce.

Meanwhile, referring to FIG. 3, in case in which the optical film 2 to be attached to the panel 3 corresponds to a polarizing film, when attaching a polarizing film onto both surfaces of the panel 3, polarizing films should be attached such that absorption axes are perpendicular to each other, and to do so, a process of rotating the panel 3 is also needed.

To perform this additional process, addition of an apparatus for reversing/rotating the panel is required, and the addition of the apparatus results in an increased process line length, causing a reduction in spatial efficiency.

DISCLOSURE

Technical Problem

The present disclosure is designed to solve the above problem, and therefore, the present disclosure is directed to increasing process efficiency in a process of attaching an optical film onto both surfaces of a panel.

However, the object of the present disclosure is not limited to the above object, and other objects of the present disclosure will become apparent to those skilled in the art from the following description.

Technical Solution

To achieve the above object, a system for laminating an optical film according to an exemplary embodiment of the present disclosure includes a panel transfer unit to transfer a panel, a first laminating unit to laminate an optical film full-cut into a predetermined length on a first surface of the panel along a first direction parallel to a transfer direction of the panel, and a second laminating unit to laminate an optical film full-cut into a predetermined length on a second surface of the panel along a second direction equal or opposite to the first direction, the second laminating unit rotating the optical film supplied in a full-cut state along the second direction in a horizontal direction and laminating the optical film.

The panel transfer unit may include a conveyor belt to support and convey the panel.

The panel transfer unit may include a transfer roller to support and convey the panel.

The panel transfer unit may have a width corresponding to a width of the panel.

The first laminating unit may include a first supply roll to supply an optical film, a first cutter to full-cut the supplied optical film into a predetermined length, a first laminating drum to adsorb and laminate the full-cut optical film on the first surface of the panel, and a first film holder disposed opposite to the first laminating drum across the optical film to hold a release sheet attached to the optical film to allow the release sheet to be separated.

The first laminating unit may include a first film cartridge to supply the full-cut optical film in place of the first supply roll and the first cutter, the first film cartridge containing a plurality of optical films full-cut in advance.

The first laminating drum may have a first adsorption hole formed on a periphery.

A first adsorption pad may be attached onto the periphery of the first laminating drum.

The second laminating unit may include a second supply roll to supply an optical film, a second cutter to full-cut the supplied optical film into a predetermined length, a rotation means to rotate the optical film full-cut into the predetermined length in a horizontal direction, a second laminating drum to adsorb and laminate the optical film rotated in the horizontal direction on the second surface of the panel, and a second film holder disposed opposite to the second laminating drum across the optical film to hold a release sheet attached to the optical film to allow the release sheet to be separated.

The second laminating unit may include a second film cartridge to supply the full-cut optical film in place of the second supply roll and the second cutter, the second film cartridge containing a plurality of optical films full-cut in advance.

The rotation means may rotate at an angle of 90°.

The second laminating drum may have a second adsorption hole formed on a periphery.

A second adsorption pad may be attached onto the periphery of the second laminating drum.

Meanwhile, the above object may be also achieved by a method for manufacturing a display unit according to an exemplary embodiment of the present disclosure, and the method for manufacturing a display unit includes (a) supplying a panel for manufacturing a display unit, (b) laminating an optical film full-cut into a predetermined length on a first surface of the panel along a first direction parallel to a transfer direction of the panel, and (c) laminating an optical film full-cut into a predetermined length on a second surface of the panel along a second direction equal or opposite to the first direction, wherein the optical film supplied in a full-cut state along the second direction is rotated in a horizontal direction and laminated.

The step (c) may be performed simultaneously or sequentially with the step (b).

The step (c) may include (c1) supplying an optical film along the second direction using a second supply roll, (c2) full-cutting the supplied optical film, (c3) rotating the full-cut optical film in a horizontal direction, and (c4) adsorbing and laminating the optical film rotated in the horizontal direction on the second surface of the panel using a second laminating drum.

The step (c3) may include rotating the optical film 90° in the horizontal direction.

The step (c) may include supplying an optical film along the second direction using a second film cartridge containing a plurality of optical films full-cut in advance, rotating the supplied optical film in a horizontal direction, and adsorbing and laminating the optical film rotated in the horizontal direction on the second surface of the panel using a second laminating drum.

Advantageous Effects

According to the present disclosure, a process of rotating and/or reversing a panel is not required, which increases process efficiency, and further, in the supply of an optical film in a roll type, when a large number of defect parts exists in an optical film roll, only a good part is separately full-cut and supplied in a chip type, resulting in improved productivity.

DESCRIPTION OF DRAWINGS

The accompanying drawings illustrate a preferred embodiment of the present disclosure and together with the foregoing disclosure, serve to provide further understanding of the technical spirit of the present disclosure, and thus, the present disclosure is not construed as being limited to the drawing.

MODE FOR DISCLOSURE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the spirit and scope of the disclosure.

First, an entire construction of a system for laminating an optical film according to an exemplary embodiment of the present disclosure is described with reference to FIG. 5.

Figure 1:
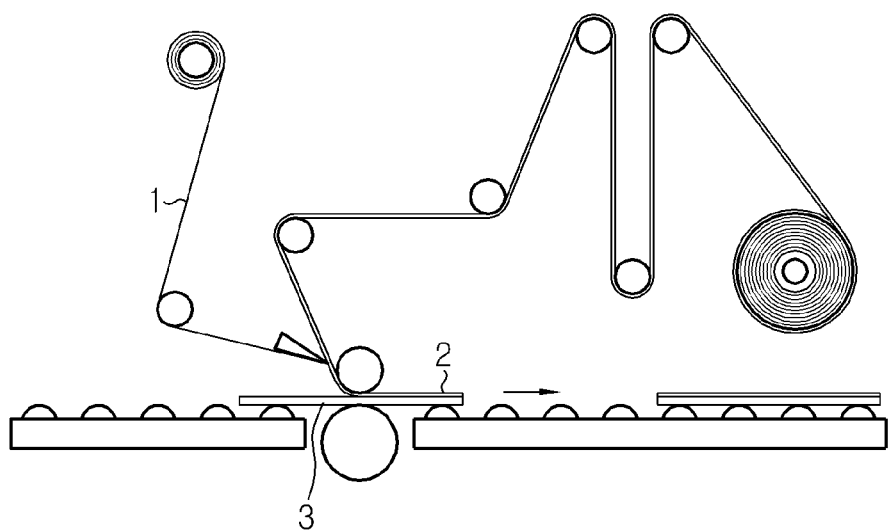
FIG. 1 is a conceptual diagram illustrating a system for laminating an optical film according to a related art.
Figure 2:
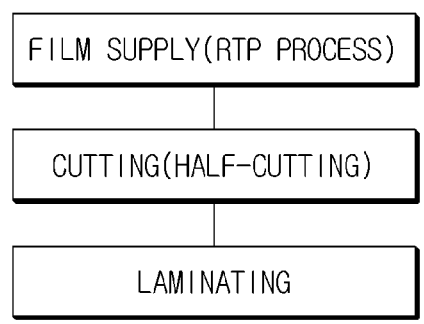
FIG. 2 is a flowchart illustrating a process according to a related art using the system for laminating an optical film shown in FIG. 1.
Figure 3:
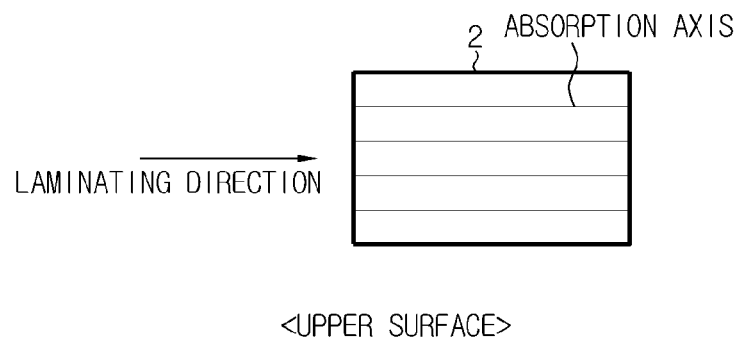
FIGS. 3 and 4 are diagrams illustrating a direction in which absorption axes of a pair of polarizing films each attached onto both sides of a panel shown in FIG. 1 are formed.
Figure 4:
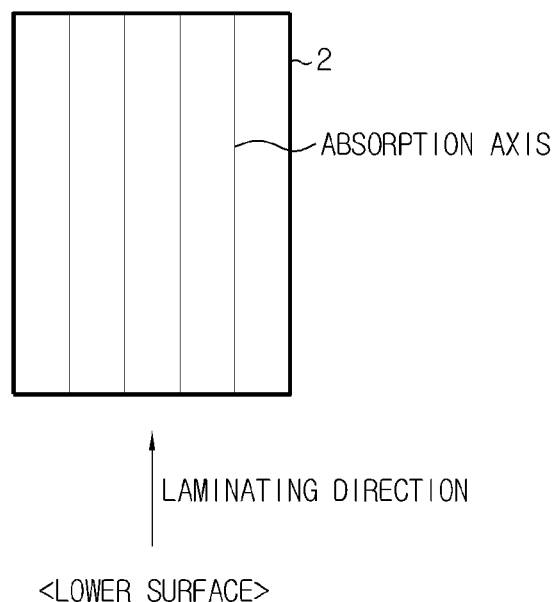
Figure 5:
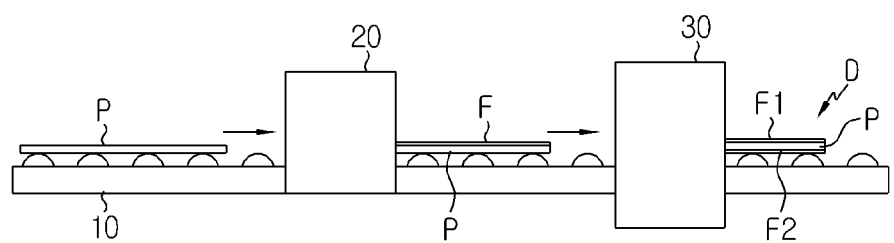
FIG. 5 is a conceptual diagram illustrating a system for laminating an optical film according to an exemplary embodiment of the present disclosure.

FIG. 5 is a conceptual diagram illustrating a system for laminating an optical film according to an exemplary embodiment of the present disclosure.

Referring to FIG. 5, the system for laminating an optical film according to an exemplary embodiment of the present disclosure includes a panel transfer unit 10, a first laminating unit 20, and a second laminating unit 30.

The panel transfer unit 10 transfers, within the system, a panel P to which an optical film F is to be attached, and has a width corresponding to a width of the panel P.

As a means for supporting and conveying the panel P, various means such as a conveyor belt or a transfer roller may be used.

The first laminating unit 20 and the second laminating unit 30 are installed on a transfer line of the panel P to laminate optical films F1 an F2 on a first surface and an opposing second surface of the panel P, respectively.

Specific functions and construction of the first laminating unit 20 and the second laminating unit 30 will be described below in more detail with reference to FIGS. 6 through 12.

First, a laminating direction on the first surface of the panel P and a laminating direction on the second surface are described with reference to FIG. 6.

Figure 6:
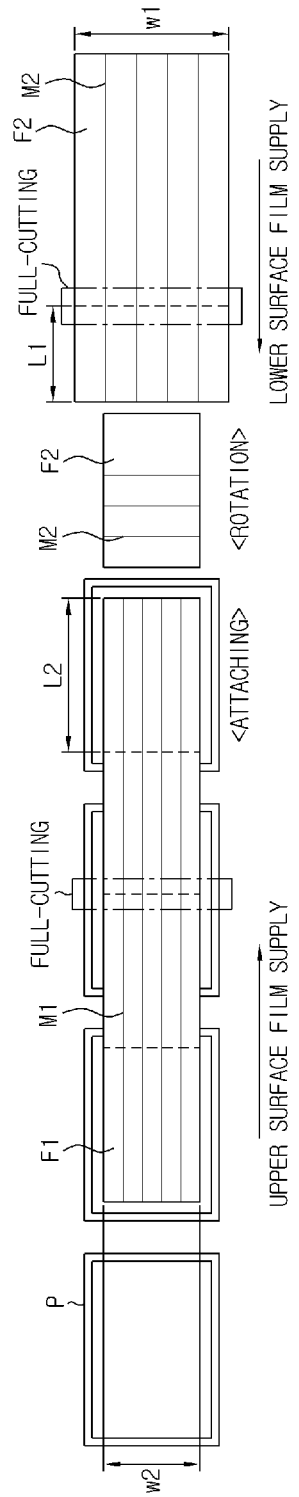
FIG. 6 is a diagram illustrating a laminating direction of an optical film by a first laminating unit and a second laminating unit shown in FIG. 5.

FIG. 6 is a diagram illustrating a laminating direction of an optical film by the first laminating unit and the second laminating unit shown in FIG. 5.

Referring to FIG. 6, the optical film F1 to be laminated on the first surface of the panel P and the optical film F2 to be laminated on the second surface are laminated along directions parallel to each other.

That is, referring to FIGS. 5 and 6 together, the first laminating unit 20 and the second laminating unit 30 laminate the optical films F1 and F2 on the first surface and the second surface of the panel P along a direction parallel to the transfer direction of the panel P.

Also, a width W1 and a length L1 of the optical film F2 to be attached onto the second surface of the panel P are respectively equal to a length L2 and a width W2 of the optical film F1 to be attached onto the first surface of the panel P.

That is, the second laminating unit 30 supplies the optical film F2 having the width W1 equal to the unit length L2 of the optical film F1 being attached to the first surface of the panel P, cuts it into the unit length L1, rotates it 90° in the horizontal direction, and attaches it onto the second surface of the panel P. Here, rotating in the horizontal direction represents rotating around an axis perpendicular to the plane of the panel P, and hereinafter will be applied as the same meaning.

As described above, rotating the optical film F2 to be laminated on the second surface of the panel P is for allowing absorption axes M1 and M2 of the optical films F1 and F2 to form a right angle, particularly, in case in which the optical films F1 and F2 correspond to a polarizing film.

Subsequently, a structure of the first laminating unit 20 is described in more detail with reference to FIGS. 7 and 8.

Figure 7:
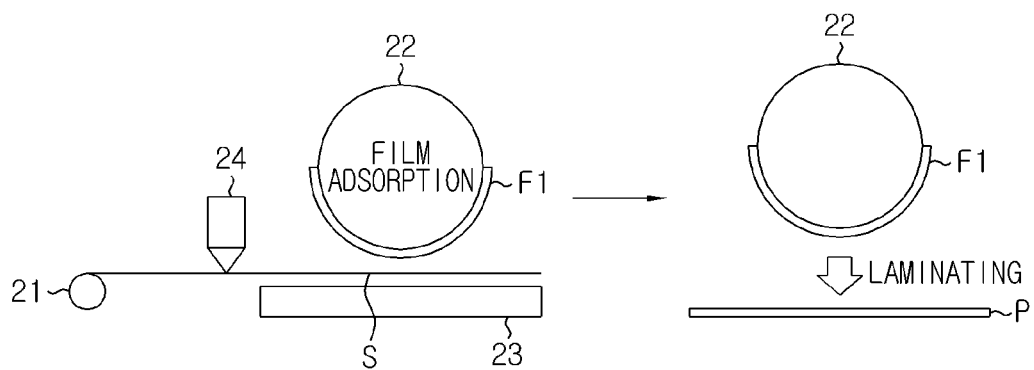
FIGS. 7 and 8 are diagrams illustrating an example of implementation of a first laminating unit shown in FIG. 5.
Figure 8:
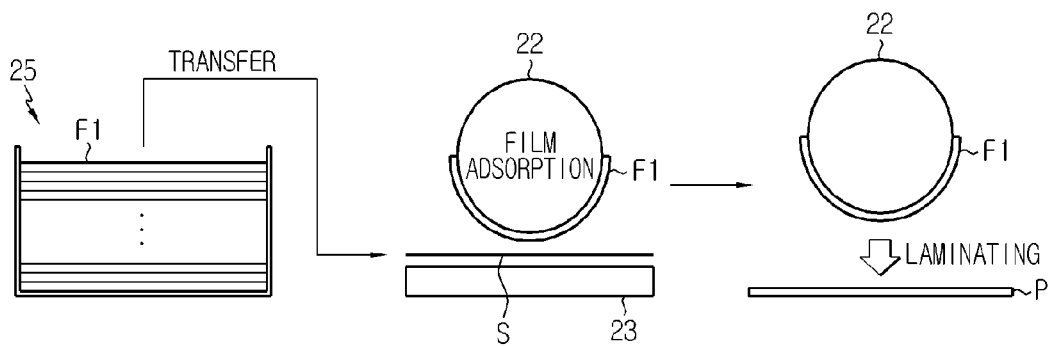

FIGS. 7 and 8 are diagrams illustrating an example of implementation of the first laminating unit shown in FIG. 5.

First, referring to FIG. 7, the first laminating unit 20 may be implemented to include a first supply roll 21, a first laminating drum 22, a first film holder 23, and a first cutter 24.

The first supply roll 21, on which the optical film F1 with a release sheet S attached onto one surface is wound, to supply the optical film F1 along a direction parallel to a movement direction of the panel P.

The first laminating drum 22 adsorbs the supplied optical film F1, and laminates it on the first surface of the panel P.

That is, referring to FIG. 7 along with FIG. 6, the first laminating drum 22 adsorbs the optical film F1 cut into the unit length L2, and laminates it on the first surface of the panel P.

The first laminating drum 22 may have an approximately cylindrical shape, and peels off/adsorbs the optical film F1 from the release sheet S and laminates the optical film F1 on the first surface of the panel P while moving between the panel P and the optical film F1.

Figure 9:
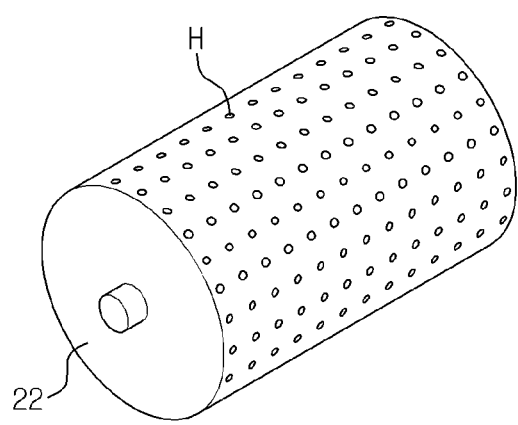
FIGS. 9 and 10 are diagrams illustrating an example of implementation of a laminating drum shown in FIGS. 7 and 8.
Figure 10:
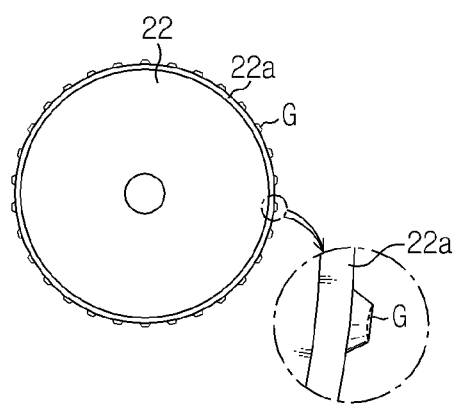

Meanwhile, the first laminating drum 22 may have various adsorption structures for adsorbing the optical film F1 on the periphery thereof, and an example of the adsorption structure is illustrated in FIGS. 9 and 10.

First, referring to FIG. 9, the first laminating drum 22 may have a plurality of adsorption holes H formed on the periphery thereof. In this case, an inner space of the first laminating drum 22 may be connected to a vacuum pump (not shown), and as the vacuum pump operates, the optical film F may be adsorbed onto the periphery of the first laminating drum 22.

Subsequently, referring to FIG. 10, an adsorption pad 22a having a plurality of adsorption grooves G may be attached onto the periphery of the first laminating drum 22.

As described above, with the surface structure capable of adsorbing the optical film F1, the first laminating drum 22 adsorbs the optical film F1 separated from the release sheet S onto the periphery along a direction perpendicular to the movement direction of the panel P, rotates the optical film F1 approximately 90° in the horizontal direction, and laminates the optical film F1 on the panel P along a direction parallel to the movement direction of the panel P.

In this instance, adhesion between the panel P and the optical film F1 is achieved by an adhesive layer formed on a surface where the release sheet S has been attached among both surfaces of the optical film F1.

Referring back to FIG. 7, the first film holder 23 is disposed opposite to the first laminating drum 22 across the optical film F1, and serves to hold the release sheet S to allow the release sheet S attached to the optical film F1 to be separated.

The first film holder 23 is not limited to a specific structure as long as it has a structure capable of holding the release sheet S to allow the release sheet S to be separated from the optical film F1 when the first laminating drum 22 adsorbs the optical film F1 and moves toward the panel P, and for example, the adsorption structure employed in the first laminating drum 22 shown in FIG. 9 may be applied.

The first cutter 24 is disposed between the first supply roll 21 and the first film holder 23, and full-cuts the optical film F1 into a predetermined length. Here, full-cutting represents cutting all the optical film F1 and the release sheet S attached onto one surface of the optical film F1, as opposed to half-cutting representing cutting only the optical film F1 while leaving the release sheet S intact, and a cutting length of the optical film F1 is determined based on the length of the panel P.

When a full-cutting technique is used, a length of the optical film F1 may be limited to less than a predetermined level, so flatness maintenance is made easy and consequently precision of an operation increases, resulting in an advantage of improved quality of attachment of the optical film F1.

Meanwhile, in the laminating of the optical film F1 on the first surface of the panel P, to perform a full-cutting process, a roll type using the first supply roll 21 for continuous supply of the optical film F1 as described in the foregoing may be applied, but as opposed to this, a chip type in which the optical film F1 having been full-cut to a size of the panel P in advance is transferred to the first laminating drum 22 using a separate transfer machine may be applied.

That is, referring to FIG. 8, the first laminating unit 20 may be implemented to further include a first film cartridge 25, in addition to the components shown in FIG. 7, to contain a plurality of optical films F1 as full-cut to the length L2 corresponding to the length of the panel P in advance.

In this case, the first film cartridge 25 corresponds to a component for supplying the full-cut optical film F1 in place of the first supply roll 21 and the first cutter 24 shown in FIG. 7.

When the first film cartridge 25 is applied, even if a large number of defect parts exist in a raw optical film wound on the first supply roll 21, only a defect-free part may be chosen out and full-cut in advance, and as a consequence, a chip-type optical film may be supplied, thereby improving productivity.

Furthermore, although not shown in the drawing explicitly, transfer of the optical film F1 between the first film cartridge 25 and the first film holder 23 may be made by a separate transfer device.

Subsequently, a structure of the second laminating unit 30 is described in more detail with reference to FIGS. 11 and 12.

Figure 11:
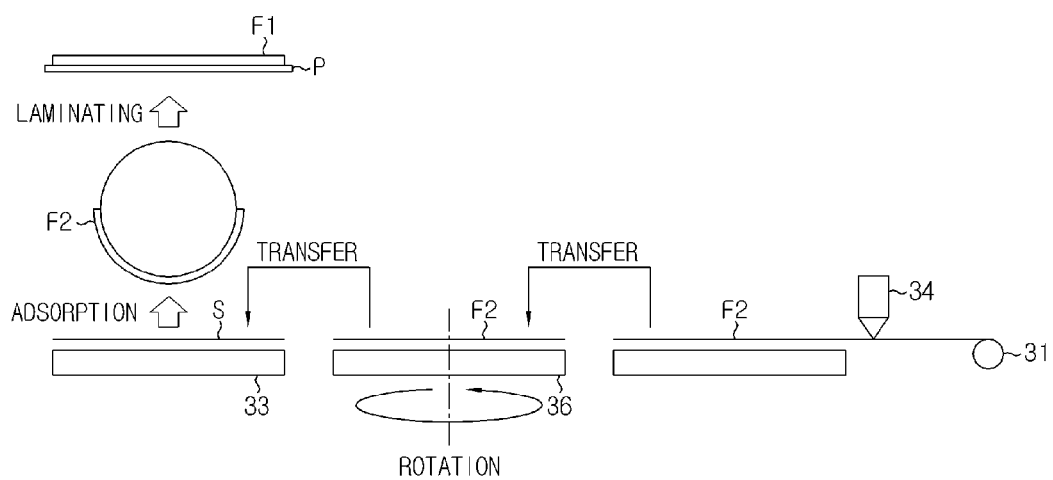
FIGS. 11 and 12 are diagrams illustrating an example of implementation of a second laminating unit shown in FIG. 5.
Figure 12:
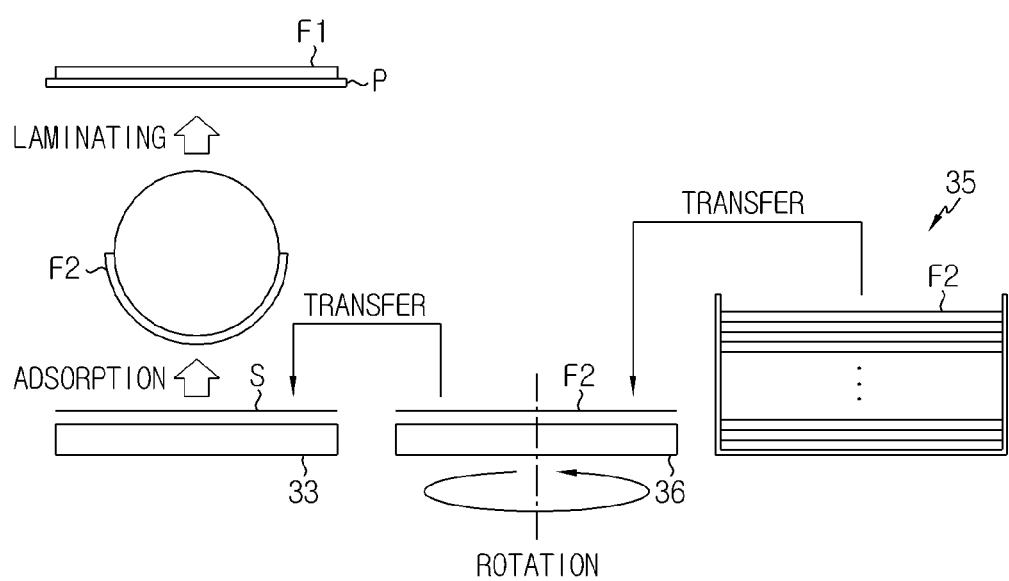

FIGS. 11 and 12 are diagrams illustrating an example of implementation of a second laminating unit shown in FIG. 5.

First, referring to FIG. 11, the second laminating unit 30 may be implemented to include a second supply roll 31, a rotation means 36, a second laminating drum 32, a second film holder 33, and a second cutter 34.

The second supply roll 31, the second laminating drum 32, the second film holder 33, and the second cutter 34 correspond to the substantially same components, respectively, as the first supply roll 21, the first laminating drum 22, the first film holder 23, and the first cutter 24 described in the foregoing, and its overlapping description is omitted herein.

The rotation means 36, on which the optical film F2 supplied by the second supply roll 31 is wound, supplies the optical film F2 along a direction parallel to a movement direction of the panel P.

The rotation means 36 rotates the optical film F2 supplied by the second supply roll 31 approximately 90° in the horizontal direction, that is, around a rotation axis extending in a direction perpendicular to the panel P, to allow absorption axes M1 and M2 of the optical films F1 and F2 being attached onto the first surface and the second surface of the panel P to be approximately perpendicular to each other.

Here, the rotation means 36 is not limited to a specific type if it is constructed to rotate around a rotation axis extending in a direction perpendicular to the panel P, to rotate the full-cut optical film F2 placed thereon, and for example, may be implemented in the form of a rotation panel which supports and rotates the optical film F2.

The optical film F2 full-cut by the second cutter 34 may be transferred to the rotation means 36 by a separate transfer means, and transfer between the rotation means 36 and the film holder 33 may be also made by a separate transfer means.

Meanwhile, in the laminating of the optical film F2 on the second surface of the panel P, to perform a full-cutting process, a roll type using the second supply roll 31 for continuous supply of the optical film F2 as described in the foregoing may be applied, but as opposed to this, a chip type in which the optical film F2 full-cut to a size of the panel P in advance is transferred to the rotation means 36 and the second laminating drum 32 using a separate transfer machine may be applied.

That is, referring to FIG. 12, the second laminating unit 30 may be implemented to further include a second film cartridge 35, in addition to the components shown in FIG. 11, to contain a plurality of optical films F2 full-cut to the length L1 corresponding to the width of the panel P in advance.

In this case, the second film cartridge 35 corresponds to a component for supplying the full-cut optical film F2 in place of the second supply roll 31 and the second cutter 34 shown in FIG. 11.

When the second film cartridge 35 is applied, similar to the case of the first laminating unit 20 described in the foregoing, even if a large number of defect parts exist in a raw optical film wound on the second supply roll 31, only a defect-free part may be chosen out and full-cut in advance, and as a consequence, a chip-type optical film may be supplied, thereby improving productivity.

As described above, in the manufacture of the display unit D (see FIG. 5) by laminating the optical film on both surfaces of the panel, the system for laminating an optical film according to an exemplary embodiment of the present disclosure is constructed to allow not only the laminating direction on the first surface and the laminating direction on the second surface but also the supply direction of the optical film F1 for laminating on the first surface and the supply direction of the optical film F2 for laminating on the second surface to be parallel to each other.

Therefore, the system for laminating an optical film according to the present disclosure may maximize spatial efficiency by minimizing a width occupied by equipment.

Also, the system for laminating an optical film according to the present disclosure is constructed to allow the optical film F2 to rotate 90° in the horizontal direction before the laminating drum 32 adsorbs the optical film F2, so naturally absorption axes of the optical films attached onto both surfaces of the panel are perpendicular to each other.

Hereinabove, the present disclosure has been described in detail. However, it should be understood that the detailed description and specific examples, while indicating preferred embodiments of the disclosure, are given by way of illustration only, since various changes and modifications within the spirit and scope of the disclosure will become apparent to those skilled in the art from this detailed description.

What is claimed is:

1. A system for laminating an optical film, comprising:
   a panel transfer unit to transfer a panel;
   a first laminating unit to laminate a first optical film full-cut into a predetermined length on a first surface of the panel along a first direction parallel to a transfer direction of the panel, the first laminating unit comprising:
      a first supply roll to supply a first optical film;
      a first cutter to full-cut the first optical film supplied by the first supply roll into a predetermined length;
      a first laminating drum to adsorb and laminate the first optical film full-cut by the first cutter on the first surface of the panel; and
      a first film holder disposed opposite to the first laminating drum across the first optical film to hold a release sheet attached to the first optical film to allow the release sheet to be separated; and
   a second laminating unit to laminate a second optical film full-cut into a predetermined length on a second surface of the panel along a second direction identical or opposite to the first direction, wherein the second laminating unit rotates the second optical film, which is supplied in a full-cut state along the second direction in a horizontal direction to allow an absorption axis of the second optical film to be perpendicular to an absorption axis of the first optical film being laminated on the first surface of the panel before laminating the second optical film.

2. The system for laminating an optical film according to claim 1, wherein the panel transfer unit includes a conveyor belt to support and convey the panel.

3. The system for laminating an optical film according to claim 1, wherein the panel transfer unit includes a transfer roller to support and convey the panel.

4. The system for laminating an optical film according to claim 1, wherein the panel transfer unit has a width corresponding to a width of the panel.

5. The system for laminating an optical film according to claim 1, wherein the first laminating unit comprises a first film cartridge to supply the first optical film full-cut, the first film cartridge containing a plurality of the first optical films full-cut in advance.

6. The system for laminating an optical film according to claim 1, wherein the first laminating drum has a first adsorption hole formed on a periphery.

7. The system for laminating an optical film according to claim 1, wherein a first adsorption pad is attached onto the periphery of the first laminating drum.

8. The system for laminating an optical film according to claim 1, wherein the second laminating unit comprises:
   a second supply roll to supply a second optical film;
   a second cutter to full-cut the second optical film supplied by the second supply roll into a predetermined length;
   a rotation means to rotate the second optical film full-cut into the predetermined length in a horizontal direction;
   a second laminating drum to adsorb and laminate the second optical film rotated in the horizontal direction on the second surface of the panel; and
   a second film holder disposed opposite to the second laminating drum across the second optical film to hold a release sheet attached to the second optical film to allow the release sheet to be separated.

9. The system for laminating an optical film according to claim 8, wherein the rotation means rotates at an angle of 90°.

10. The system for laminating an optical film according to claim 8, wherein the second laminating drum has a second adsorption hole formed on a periphery.

11. The system for laminating an optical film according to claim 8, wherein a second adsorption pad is attached onto the periphery of the second laminating drum.

12. The system for laminating an optical film according to claim 1, wherein the second laminating unit comprises a second film cartridge to supply the second optical film full-cut, the second film cartridge containing a plurality of optical films full-cut in advance.

13. A method for manufacturing a display unit, comprising:
(a) supplying a panel for manufacturing a display unit;
(b) supplying a first optical film from a first supply roll, cutting the first optical film to provide a full-cut first optical film of a predetermined length, adsorbing and laminating the first optical film full-cut into the predetermined length on a first surface of the panel along a first direction parallel to a transfer direction of the panel, and holding a release sheet attached to the first optical film to allow the release sheet to be separated; and
(c) laminating a second optical film full-cut into a predetermined length on a second surface of the panel along a second direction equal or opposite to the first direction,
wherein the second optical film supplied in a full-cut state along the second direction is rotated in a horizontal direction to allow an absorption axis of the second optical film to be perpendicular to an absorption axis of the first optical being laminated on the first surface of the panel before being laminated.

14. The method for manufacturing a display unit according to claim 13, wherein the step (c) is performed simultaneously or sequentially with the step (b).

15. The method for manufacturing a display unit according to claim 13, wherein the step (c) comprises:
(c1) supplying a second optical film along the second direction using a second supply roll;
(c2) full-cutting the second supplied optical film supplied by the second supply roll;
(c3) rotating the second optical film full-cut in a horizontal direction; and
(c4) adsorbing and laminating the second optical film rotated in the horizontal direction on the second surface of the panel using a second laminating drum.

16. The method for manufacturing a display unit according to claim 15, wherein the step (c3) comprises rotating the second optical film 90° in the horizontal direction.

17. The method for manufacturing a display unit according to claim 13, wherein the step (c) comprises:
supplying a second optical film along the second direction using a second film cartridge containing a plurality of optical films full-cut in advance;
rotating the second supplied optical film in a horizontal direction; and
adsorbing and laminating the second optical film rotated in the horizontal direction on the second surface of the panel using a second laminating drum.

* * * * *